(12) United States Patent
Manosalvas-Kjono

(10) Patent No.: US 11,780,509 B1
(45) Date of Patent: Oct. 10, 2023

(54) MODULAR AERODYNAMIC SYSTEM

(71) Applicant: Aeromutable Corporation, Ramona, CA (US)

(72) Inventor: David Esteban Manosalvas-Kjono, Chicago, IL (US)

(73) Assignee: Aeromutable Corporation, Ramona, CA (US)

( * ) Notice: Subject to any disclaimer, the term of this patent is extended or adjusted under 35 U.S.C. 154(b) by 519 days.

(21) Appl. No.: 17/023,298

(22) Filed: Sep. 16, 2020

Related U.S. Application Data

(60) Provisional application No. 62/901,742, filed on Sep. 17, 2019.

(51) Int. Cl.
| | |
|---|---|
| *B62D 35/00* | (2006.01) |
| *B60Q 9/00* | (2006.01) |
| *F15D 1/12* | (2006.01) |
| *G01P 1/07* | (2006.01) |
| *G01P 5/00* | (2006.01) |

(52) U.S. Cl.
CPC .............. *B62D 35/001* (2013.01); *B60Q 9/00* (2013.01); *F15D 1/12* (2013.01); *G01P 1/07* (2013.01); *G01P 5/00* (2013.01)

(58) Field of Classification Search
CPC ........... B62D 35/001; B60Q 9/00; F15D 1/12; G01P 1/07; G01P 5/00
See application file for complete search history.

(56) References Cited

U.S. PATENT DOCUMENTS

| | | | | |
|---|---|---|---|---|
| 3,999,797 A | * | 12/1976 | Kirsch | B62D 35/001 244/130 |
| 2011/0095564 A1 | * | 4/2011 | Chen | B62D 35/001 296/180.4 |
| 2013/0106135 A1 | * | 5/2013 | Praskovsky | B62D 35/001 296/180.1 |
| 2017/0183043 A1 | * | 6/2017 | Connors | F15D 1/0055 |

FOREIGN PATENT DOCUMENTS

| | | | | |
|---|---|---|---|---|
| DE | 202009015009 U1 | * | 2/2010 | .......... B62D 35/001 |
| DE | 102014016767 A1 | * | 6/2015 | .......... B62D 35/001 |
| WO | WO-2016025699 A2 | * | 2/2016 | .......... B62D 35/001 |
| WO | WO-2016151319 A1 | * | 9/2016 | .......... B62D 35/001 |
| WO | WO-2016187301 A2 | * | 11/2016 | .......... B62D 35/001 |

* cited by examiner

*Primary Examiner* — Lori Lyjak
(74) *Attorney, Agent, or Firm* — Fenwick & West LLP

(57) ABSTRACT

A modular aerodynamic system for a vehicle includes multiple nozzles that generate airsheets. The airflow from the nozzles may be controlled separately. Thus, the nozzles collectively enable granular control of the overall air velocity profile around (e.g., behind) the vehicle. The airsheet configuration may allow the system to control the wake behind the vehicle for various purposes, such as drag reduction, stabilization, and/or breaking. The overall air velocity profile may increase the back pressure of the vehicle, reducing energy consumption. The system may also move the center of pressure and changing the dynamic response of the vehicle to other external forces. These changes may be implemented dynamically in response to aerodynamic/dynamic changes.

19 Claims, 8 Drawing Sheets

Representation of the wake of a Semi without using the System

Representation of the wake of a Semi using the System

MODULAR AERODYNAMIC SYSTEM

CROSS REFERENCE TO RELATED APPLICATIONS

This application claims the benefit of U.S. Provisional Application No. 62/901,742, filed Sep. 17, 2019, which is incorporated by reference.

BACKGROUND

1. Technical Field

The subject matter described generally relates to aerodynamic systems and, in particular, to a modular system for manipulating the aerodynamic profile of a vehicle.

2. Background Information

Aerodynamic forces have a significant impact on the performance and safety of vehicles. For example, the sharp corners of flat-back vehicles such as semi-trucks ("semis") may cause flow separation and a low-pressure turbulent wake. This can have a significant impact on fuel efficiency, increasing operating costs and causing environmental harm. Aerodynamic forces may also contribute to vehicle instability and may even cause a vehicle to tip over (e.g., when exposed to strong crosswinds). Thus, the impact of aerodynamic forces on vehicles also raises safety concerns.

DETAILED DESCRIPTION

Figure 1:
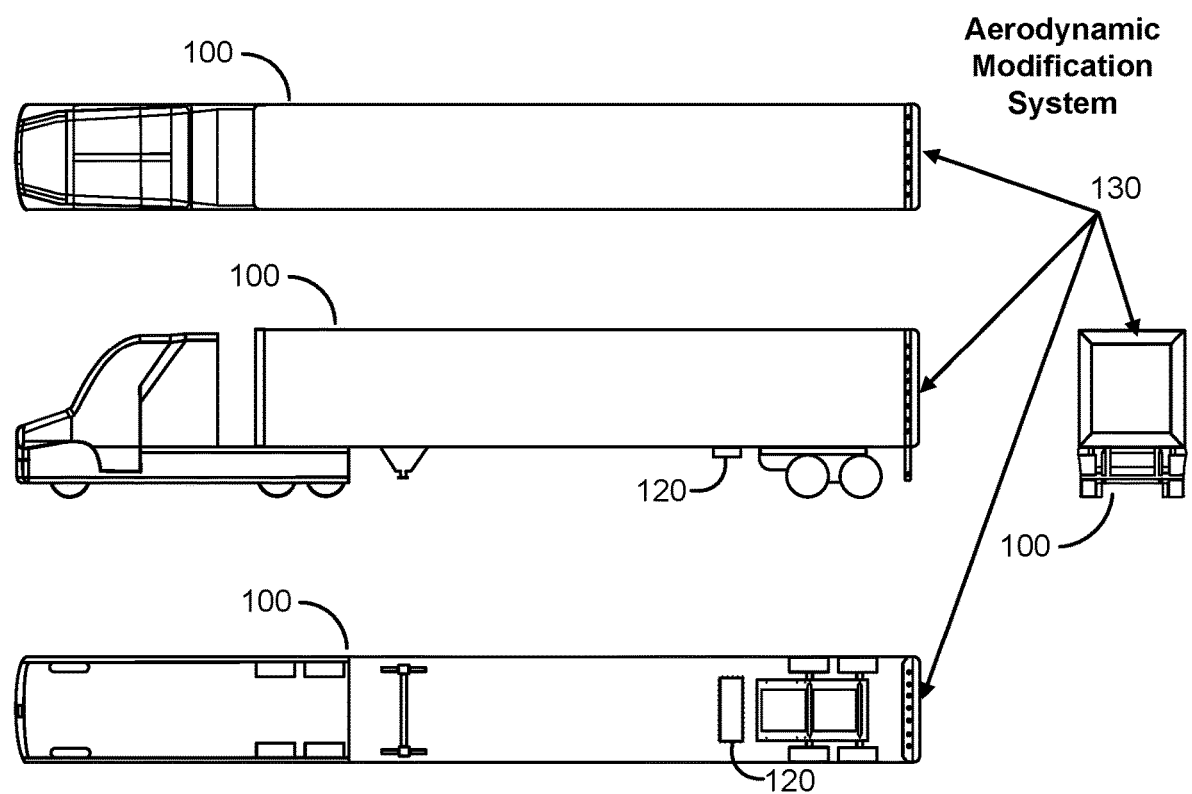
FIG. 1 is a schematic representation of a tractor and trailer using a modular aerodynamic system, according to one embodiment.

Reference will now be made to several embodiments, examples of which are illustrated in the accompanying figures. It is noted that wherever practicable similar or like reference numbers are used in the figures to indicate similar or like functionality. Alternative embodiments of the structures and methods may be employed without departing from the principles described.

Overview

In various embodiments, a modular system is positioned at the rear end of a vehicle (e.g., a flat-back vehicle such as a semi). The modular system uses modular air injection and/or suction to modify the aerodynamic profile of the vehicle. In one embodiment, the modular system helps the incoming air flow negotiate features of the vehicle (e.g., sharp corners) that otherwise would cause flow separation and a low-pressure turbulent wake. The aerodynamic modification changes the way the vehicle interacts with the air surrounding it using targeted suction and/or air injection to change the wake and the vehicle pressure distribution. Thus, the system may change the vehicle's dynamic response in real time. The blowing and/or suction configuration may be used to change the stability of the vehicle, improve its fuel efficiency by reducing its aerodynamic drag, compliment the breaking capabilities of the vehicle by increasing its aerodynamic drag, change the path air takes to improve cooling, modify the location of side vortices to reduce soiling, redirect air to improve acoustics within the vehicle, and/or provide other desired modifications to the vehicle's aerodynamic profile.

In one embodiment, the system includes a source capable of generating air pressures above and below the air surrounding the vehicle, a modular array with multiple airsheet-generating nozzles that create a desired air injection profile, and a surface that has at least a portion that is not parallel with the direction of air being injected. This surface may be curved (e.g., semicircular) and begin substantially parallel to the initial direction of air being injected before curving inwards (i.e., towards a longitudinal axis of the vehicle) such that it has a non-zero angle relative to the initial direction of the injected air. The nozzles are designed to produce specific velocity profiles while reducing the energy required to do so. Note that the system may be an integral part of a vehicle or added to an already complete vehicle (e.g., as a retrofit).

Among other advantages, the modular design of the system allows for the replacement of individual nozzles after they have completed their lifecycle, to use specialized nozzle designs based on the vehicle's operational geography and weather, and to upgrade and update parts of the system as desired by the final user. In addition to the versatility afforded by the modularity of the system when it comes to interchangeability and replacement, the system may provide higher control authority in the wake of the vehicle, as each nozzle velocity profile can be controlled separately. This higher resolution in the control of the wake may enable improved aerodynamic manipulation, relative to existing approaches, in addition to higher energy efficiency as air injection and suction can be applied in a targeted manner to achieve the desired result.

Example Systems

FIG. 1 illustrates one embodiment of the modular aerodynamic system 130 installed on a vehicle 100 (in this case, a semi) from multiple perspectives. In the embodiment shown, the modular aerodynamic system 130 is mounted at the rear of the vehicle 100. As can be seen from the rear perspective, the modular aerodynamic system 130 is mounted around the periphery of the rear-facing surface of the vehicle 100. In other embodiments, the modular aerodynamic system 130 may be mounted on other types of vehicle or in different configurations. For example, a modular aerodynamic system 130 may be mounted on the rear of the tractor or underside of the trailer instead of or in addition to the back of the trailer.

The modular aerodynamic system 130 receives pressurized air from a source 120. The source 120 collects air from the environment surrounding the vehicle 100. The source 120 may include one or more compressor or blowers to provide the collected air to the modular aerodynamic system 130 at a pressure greater than that of the vehicle's environment. In FIG. 1, the source 120 is shown as being mounted on the underside of the vehicle 100 in front of the wheel train. Thus, the source 120 collects air from underneath the vehicle 100. This may be advantageous because it is relatively close to where the nozzles are mounted, making connection relatively simple, and the aerodynamic disturbances caused by typical semis result in a high-pressure zone at that location, meaning less energy may be expended raising the collected air to the desired pressure. In other embodiments, the source 120 may be positioned elsewhere on the vehicle 100 (e.g., one or more compressors or blowers may be located within the structure of the modular aerodynamic system 130 and collect air from the rear of the vehicle 100). Furthermore, there may be multiple sources 120 at different positions on the vehicle.

Figure 2:
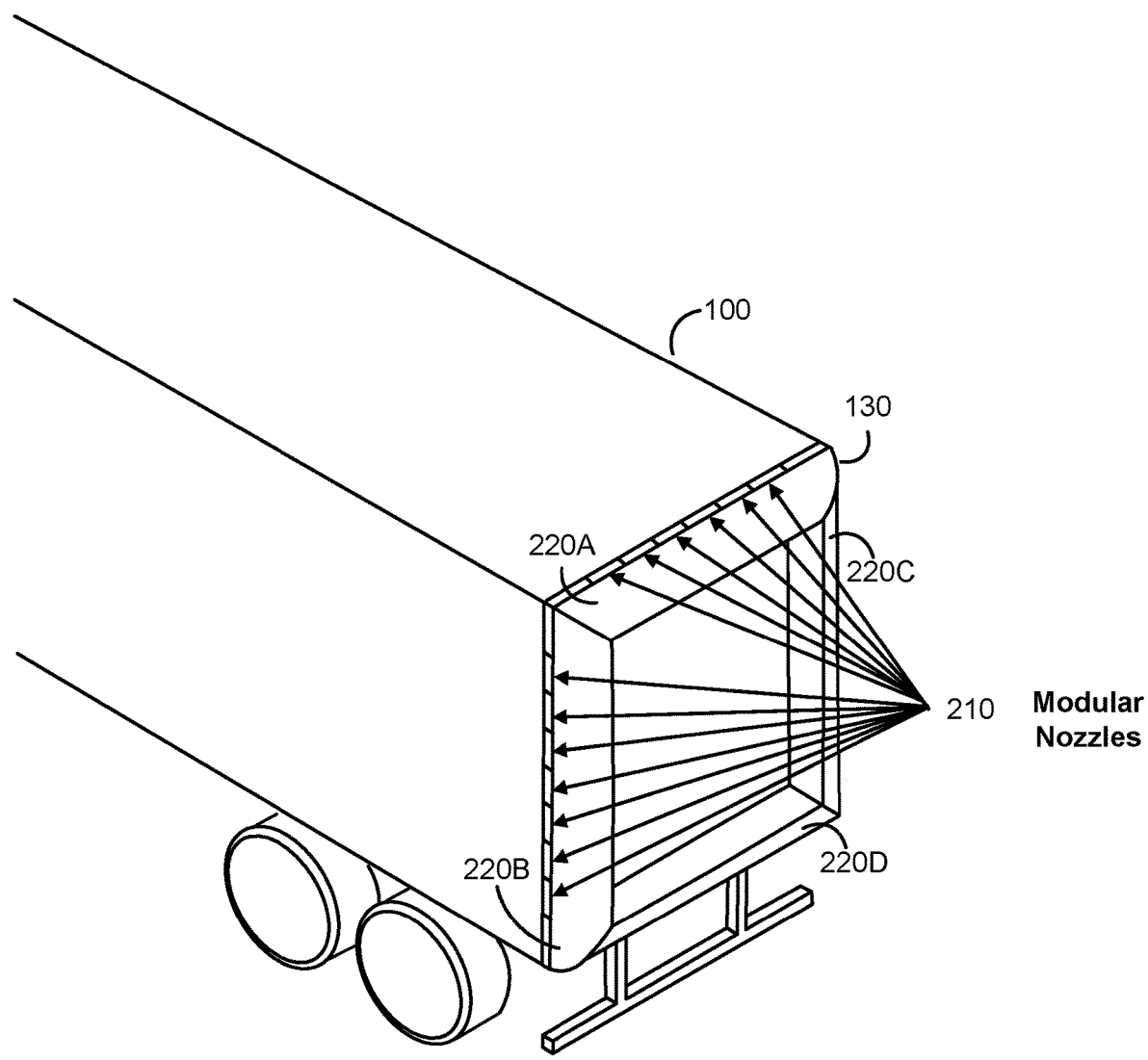
FIG. 2 illustrates the modular aerodynamic system of FIG. 1 in greater detail, according to one embodiment.

FIG. 2 illustrates one embodiment of the modular aerodynamic system 130 in greater detail. The modular aerodynamic system 130 includes a set of modular nozzles 210 mounted around the edge of the rear end of the vehicle 100. A set of airflow shaping components 220A-D are mounted around the edges of the rear end of the vehicle. Alternatively, the airflow shaping components 220A-D may be an integral part of the vehicle.

In the embodiment shown, the airflow shaping components 220A-D have curved surfaces positioned such that air sucked into or blown out of each nozzle in the set 210 travels along the curved surfaces. As described previously, the curved surfaces may begin substantially parallel to the initial direction of the injected air and then angle inwards to have a non-zero angle relative to the initial direction of the injected air. Although a single curved surface is shown along each side of the rear end of the trailer, two or more surfaces may be positioned along each side. For example, each nozzle 210 may have a dedicated surface positioned such that the emitted air sheet travels along it. As noted previously, components for providing pressurized air to the modular nozzles 210, such as blowers, compressors, and conduits, may be located within the airflow shaping components 220A-D. In another embodiment, the airflow shaping components 220A-D are planar surfaces that are angled inwards toward the longitudinal axis of the vehicle 100. In other words, the planar surfaces have a non-zero angle relative to the initial direction of the airflow generated by the corresponding nozzles 210.

The modular aerodynamic system 130 controls the wake of the vehicle 100 by injecting and/or suctioning air through some or all of the set of nozzles 210 to manipulate the air behind the vehicle. Each edge of the rear of the vehicle may be equipped with multiple nozzles 210 that inject or suck air over the corresponding airflow shaping components 220A-D. Each one of the nozzles 210 have dedicated air connections, which may be controlled independently. Thus, the velocity of the air injected or sucked into the nozzles 210 may be individually controlled. In addition, the system 130 may be configured such that each nozzle 210 can be removed and replaced separately. For example, each nozzle 210 may be connected to the vehicle 100 individually using fasteners. This can allow faster maintenance, better performance, and high-resolution aerodynamic control authority as each nozzle 210 can be tuned, customized, and replaced in order to address the needs of the vehicle operator.

In one embodiment, the nozzles 210 inject air substantially parallel to the portion of a corresponding curved surface of the air shaping components 220A-D that is closest to the particular nozzle. The average velocity of air injected by or sucked into the nozzles 210 may be up to fifty-five meters per second relative to the vehicle 100. The geometric configuration within the nozzles 210 shapes the air into a thin sheet. This airsheet features higher velocity closer to the curved surface than further away from it, which causes the airsheet to stay attached to the surface longer and turn, following the surface shape inward. The direction of motion of the air being injected generates a pressure gradient that drives the freestream air surrounding the vehicle 100 to bend in the same direction as the air being injected, which is a phenomenon called the Coandă effect. The higher the injected air velocity, the longer it stays attached to the surface and the more it turns the air inwards. Thus, the extent to which the air bends as it passes the curved surface may be controlled by varying the air injection velocity.

Further control of the air behind the vehicle 100 is provided by the positioning of multiple airsheet nozzles 210 along each edge of the rear end of the vehicle. This configuration increases the resolution of air injection and suction by enabling granular air injection at specific points along each edge. The multi-nozzle, modular design enables targeted use of air in areas where it is needed the most, which may provide decreased energy usage and air savings.

The combination of air being injected/suctioned, and the freestream air being bent, also improves the control authority of the modular aerodynamic system 130. The modular aerodynamic system 130 can modify the behavior of the wake and change the aerodynamic behavior of the vehicle 100 by modifying its center of pressure. By changing the location of the center of pressure, as well as the magnitude of the aerodynamic forces acting on the vehicle 100, the modular aerodynamic system 130 can actively manipulate the stability, drag, and lift generated. This may enable actively changing the behavior of the vehicle to optimize its behavior and functionality. For example, the modular aerodynamic system 130 can be used to increase stability, decrease fuel consumption, prevent blow-overs, and/or reduce run-away situations.

The output from the nozzles 210 can be controlled by a computer-based aerodynamic control system 300. The aerodynamic control system 300 may be located anywhere within the vehicle 100. For example, the aerodynamic control system 300 may be part of an on-board computer that manages operation of various components of the vehicle. Alternatively, some or all of the aerodynamic control system 300 may be located remotely from the vehicle 100 and communicate with the vehicle 100 via a wireless network.

Figure 3:
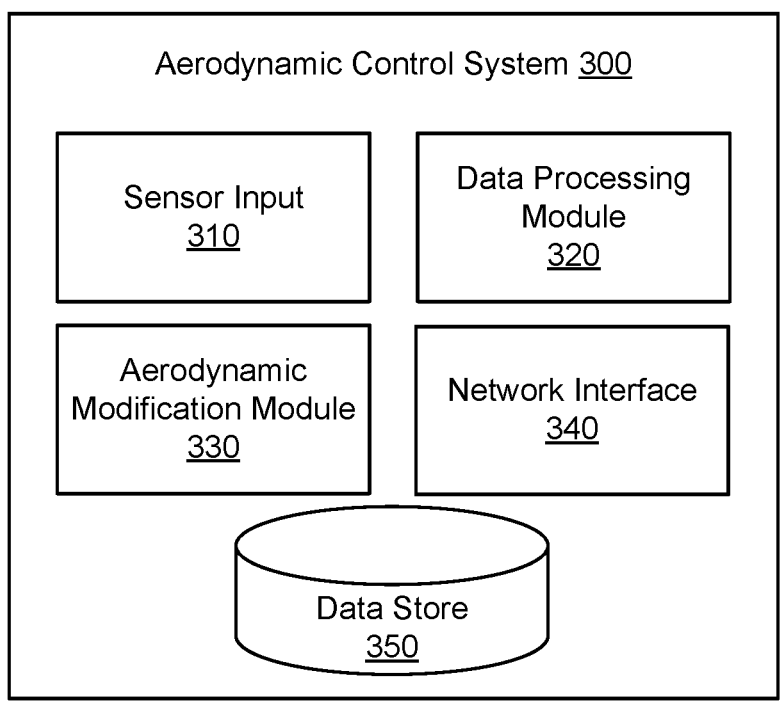
FIG. 3 is a block diagram illustrating the components of an aerodynamic control system, according to one embodiment.

FIG. 3 illustrates one embodiment of an aerodynamic control system 300 suitable for controlling a modular aerodynamic system 130. In the embodiment shown in FIG. 3, the aerodynamic control system 300 includes one or more sensor inputs 310, a data processing module 320, an aerodynamic modification module 330, a network interface 340, and a data store 350. In other embodiments, the aerodynamic control system 300 contains different or additional elements. In addition, the functions may be distributed among the elements in a different manner than described.

The one or more sensor inputs 310 receive sensor data from one or more sensors mounted on or inside the vehicle. Examples of sensors include temperature sensors, pressure sensors, velocity sensors, accelerometers, gyroscopes, barometers, fuel gauges, humidity sensors, force sensors, and the like. In some embodiments, the sensor inputs 310 may also receive sensor data from remote sources, such as other vehicles, weather services, traffic monitoring services, and the like.

The data processing module 320 processes data received by the sensor inputs 310 to determine a desired air velocity profile. For example, if the sensor data indicates that the vehicle 100 is braking, the data processing module 320 can determine that the modular aerodynamic system 130 should generate an air velocity profile to aid in slowing the vehicle 100. Similarly, if the sensor data indicates the vehicle 100 is cruising, the data processing module 320 may determine that the modular aerodynamic system 130 should provide drag reduction, and if the sensor data indicates crosswinds with a strength greater than a compensation threshold, the modular aerodynamic system 130 may instruct the modular aerodynamic system 130 to counteract those crosswinds in a stability enhancement mode, as well as to inform the driver of the risks of continuing during extreme conditions. For example, if the crosswind strength is greater than the threshold strength but lower than a warning threshold, the aerodynamic system 130 may provide compensation but take no further action. In contrast, if the crosswind strength also exceeds the warning threshold, the data processing module 320 may cause a "high crosswind" warning to be displayed to the driver (e.g., on the dashboard of the vehicle 100 or via a computing device within the vehicle such as a smartphone, tablet, or navigation system). Additionally or alternatively, a notification of the high wind may be sent to a fleet management system (e.g., via the internet) to cause a warning to be displayed to a fleet manager or other operator.

The aerodynamic modification module 330 determines the average velocity of airsheet that each nozzle 210 should generate to achieve the desired air velocity profile. The aerodynamic modification module 330 generates control signals to each nozzle 210 indicating whether the corresponding nozzle should inject air or suck and the magnitude of average velocity differential it should generate relative to the surrounding air. Thus, the nozzles 210 collectively create the desired air velocity profile in response to the control signals generated by the aerodynamic modification module 330.

The network interface 340 enables the aerodynamic control system 300 to communicate with other devices over a network. In one embodiment, the network interface 340 enables the aerodynamic control system 300 to communicate via the internet with a server (e.g., a fleet management server). The aerodynamic control system 300 may receive additional sensor data (e.g., weather data, traffic data, road condition data, etc.) via the network and/or send data (e.g., sensor data) to the server. This additional data may be used by the data processing module 320 in determining the desired air velocity profile (e.g., to prepare for upcoming weather or road conditions). In some embodiments, the aerodynamic control system 300 may send sensor data directly to other vehicles via the network interface 340.

The data store 350 includes one or more non-transitory computer-readable media that store data used by the aerodynamic control system 300. For example, the aerodynamic control system 300 may store sensor data in the data store 350 for auditing purposes. The aerodynamic control system 300 may also use stored sensor data to detect changes in conditions of the vehicle 100 or its environment over time.

Example Use Cases

Figure 4:
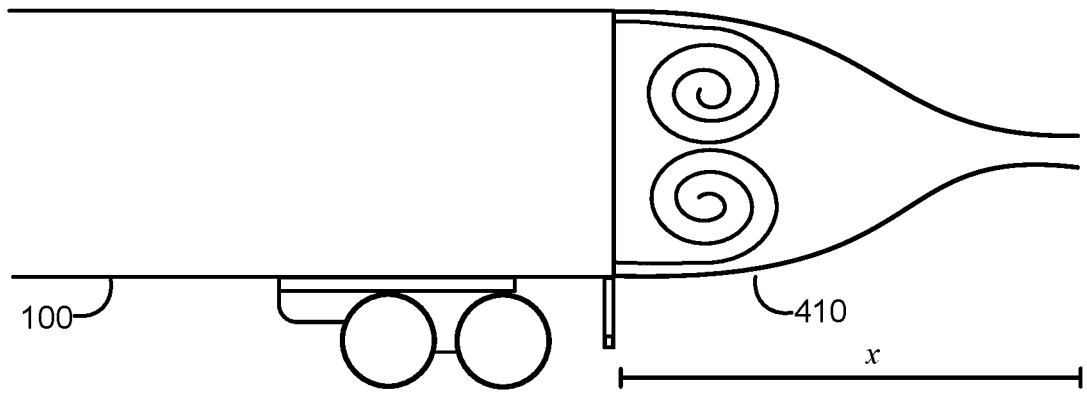
FIG. 4 illustrates the modular aerodynamic system modifying the wake of a semi, according to one embodiment.
Figure 4:
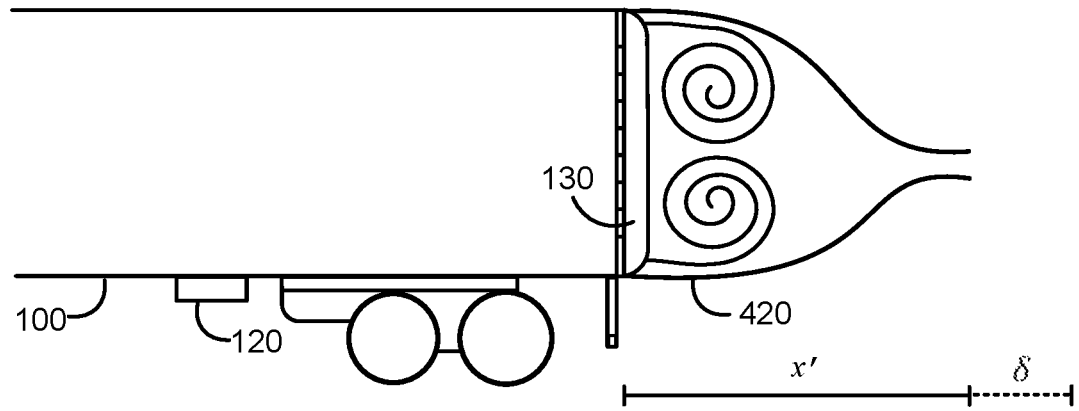

One example use case is the modular aerodynamic system 130 generating a specific air velocity profile to reduce drag on a vehicle 100. The modular aerodynamic system 130 may introduce high momentum air at the back of the vehicle 100. The jet injection configuration is selected to reduce the size of the wake and increase the overall pressure distribution at the back of the vehicle 100. The modular aerodynamic system 130 may dynamically change the air injection configuration of the nozzles 210 to optimize the wake size at different speeds and different environmental conditions around the vehicle 100 (e.g., based on sensor data generated by one or more sensors). As shown in FIG. 4, without the modular aerodynamic system 130, the vehicle 100 creates a turbulent wake 410 of length x. In contrast, using the modular aerodynamic system 130, the vehicle wake 420 has a length of x', which is equal to x-δ. The reduction in wake length of δ reduces drag, resulting in fuel savings.

Figure 5:
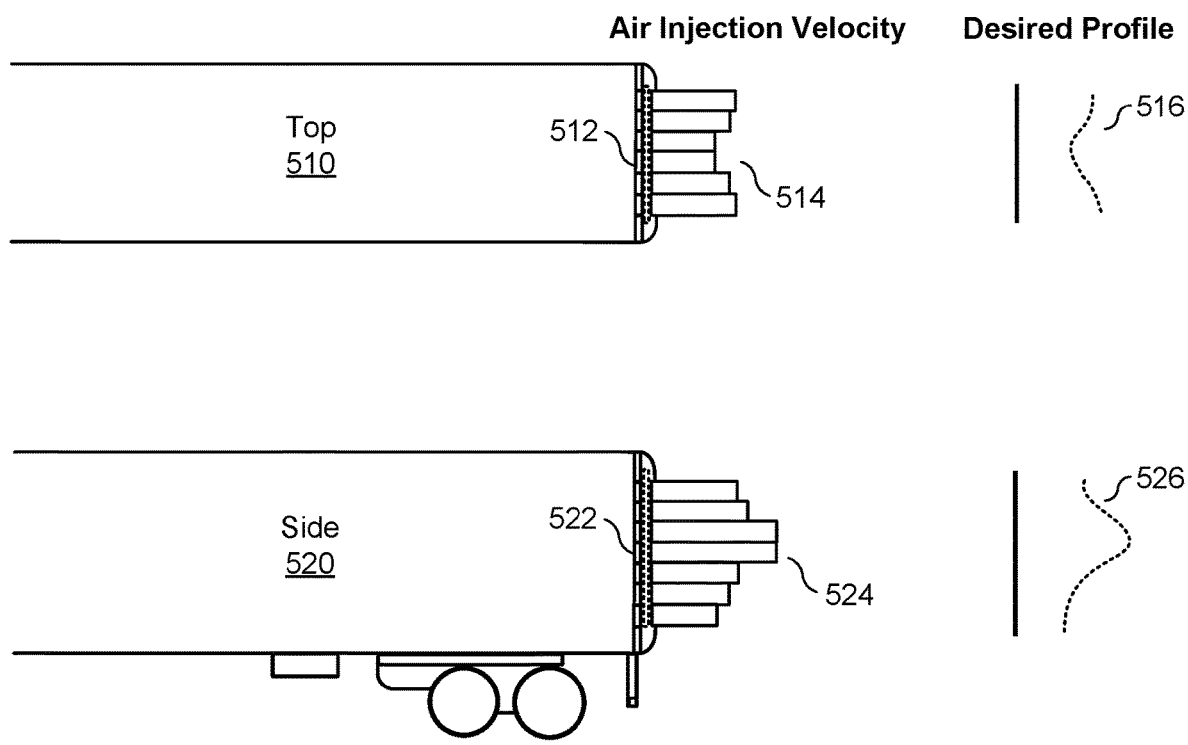
FIG. 5 illustrates an example air velocity profile that may be generated by the modular aerodynamic system to reduce drag, according to one embodiment.

FIG. 5 illustrates an example air velocity profile that may be used to reduce drag, according to one embodiment. In the example shown, a trailer has a modular aerodynamic system 130 mounted on its rear end. The modular aerodynamic system 130 has a set of six nozzles 512 along the top 510 of the trailer (and a corresponding set of six nozzles along the bottom of the trailer) while the starboard side 520 of the trailer has a set of seven nozzles 522 (as does the port side). For drag reduction, the top and bottom sets of nozzles are typically paired, meaning they produce the same air injection profiles 514. Similarly, the port and starboard sets of nozzles are typically paired. However, this is not required and there may be variations between either or both paired sets.

In the example illustrated in FIG. 5, the air injection velocities for the top (and bottom) nozzles 512 has generally medium velocities (e.g., between twelve and thirty meters per second) that are slightly higher towards the sides 520 of the trailer. This approximates the desired profile 516. Similarly, the starboard set of nozzles 522 (and the port side set) have an air injection profile 524 that approximates a desired profile 526. In this case, the air injection profile 524 for the sides 520 starts with medium values towards of the bottom of the trailer body (e.g., between twelve and thirty meters per second), raises to a peak slightly above the midpoint of the height of the trailer body (e.g., between twenty and fifty-five meters per second), and then returns back to a medium value that, in this case, is slightly higher than the velocity at the bottom of the trailer body (e.g., between fifteen and thirty-five meters per second). The desired profile 516 may be determined by any suitable method, such as wind tunnel experiments and/or computer modelling. It should be understood that the illustrated profiles are just one example and that variations may be used to achieve drag reduction.

Another example use case for the modular aerodynamic system 130 is generating a specific air velocity profile to improve the braking capabilities of the vehicle 100. When going downhill, heavy vehicles 100 may experience difficulties reducing their speed due to the large forces involved. The modular aerodynamic system 130 can provide an aerodynamic brake to aid traditional braking systems. In particular, the modular aerodynamic system 130 may generate an air velocity profile that decreases the vehicle's terminal speed by increasing the vehicle's drag coefficient. This may be done by manipulating the wake such that the pressure signature at the back of the vehicle decreases. For example, this may be achieved by generating high momentum air towards the center of the vehicle 100 in the top and bottom sides, while reducing the momentum on the port and starboard sides 520.

Figure 6:
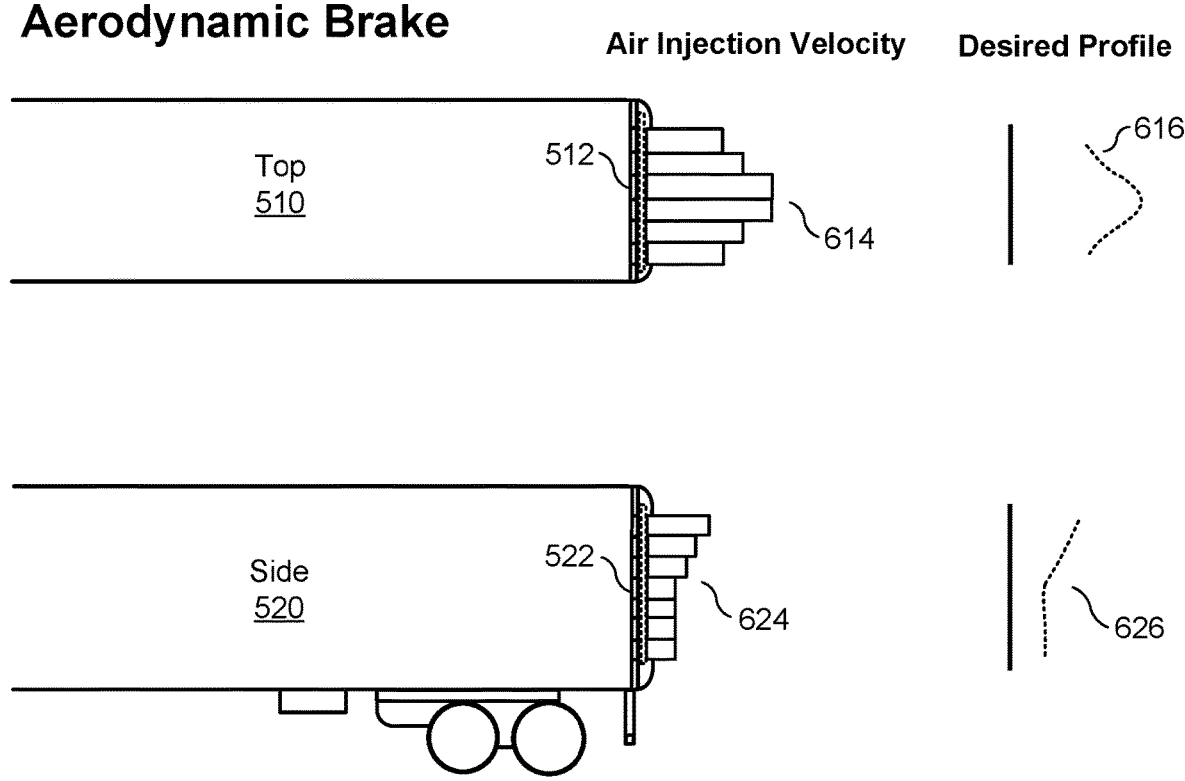
FIG. 6 illustrates an example air velocity profile that may be generated by the modular aerodynamic system to provide aerodynamic braking, according to one embodiment

FIG. 6 illustrates an example air velocity profile suitable for providing aerodynamic braking, according to one embodiment. In the example shown, the same modular aerodynamic system 130 as the previous example is being used. As with the previous example, the bottom set of nozzles is paired with the top pair of nozzles 512 and the starboard set of nozzles is paired with the port set of nozzles 522. The air injection profile 614 for the top set of nozzles 512 (and the bottom set of nozzles) approximates a desired profile 616 that has a medium value (e.g., between twelve and thirty meters per second) towards the port side of the trailer, raises to a high value (e.g., between twenty-five and fifty-five meters per second) at the center of the trailer, and then drops back to the same (or a similar) medium value. The port set of nozzles 522 (as well as the starboard set of nozzles) create a profile 624 that approximates a desired profile 626 with generally low values (e.g., between four and fifteen meters per second) that begin increasing at the midpoint of the side of the trailer 520 towards the top 510. It should be understood that the illustrated profiles are just one example and that variations may be used to achieve aerodynamic braking.

Another example issue case of the modular aerodynamic system 130 is generating a specific air velocity profile to increase the stability of a vehicle 100. A significant cause of instability in heavy vehicles 100 is side winds and gusts. These environmental phenomena interact with the sides of the vehicle 100 and cause an aerodynamic force that pushes the vehicle, and particularly a trailer due to its large side area, sideways. By modifying the air injection momentum in the port and starboard sides of the modular aerodynamic system 130, the force induced by the side wind or gust may be counteracted, in this way eliminating, or significantly reducing its effect on the overall stability of the vehicle 100. For example, the modular aerodynamic system 130 may dynamically modify the air velocity profile to counteract lateral forces detected by one or more sensors mounted on the vehicle 100.

Figure 7:
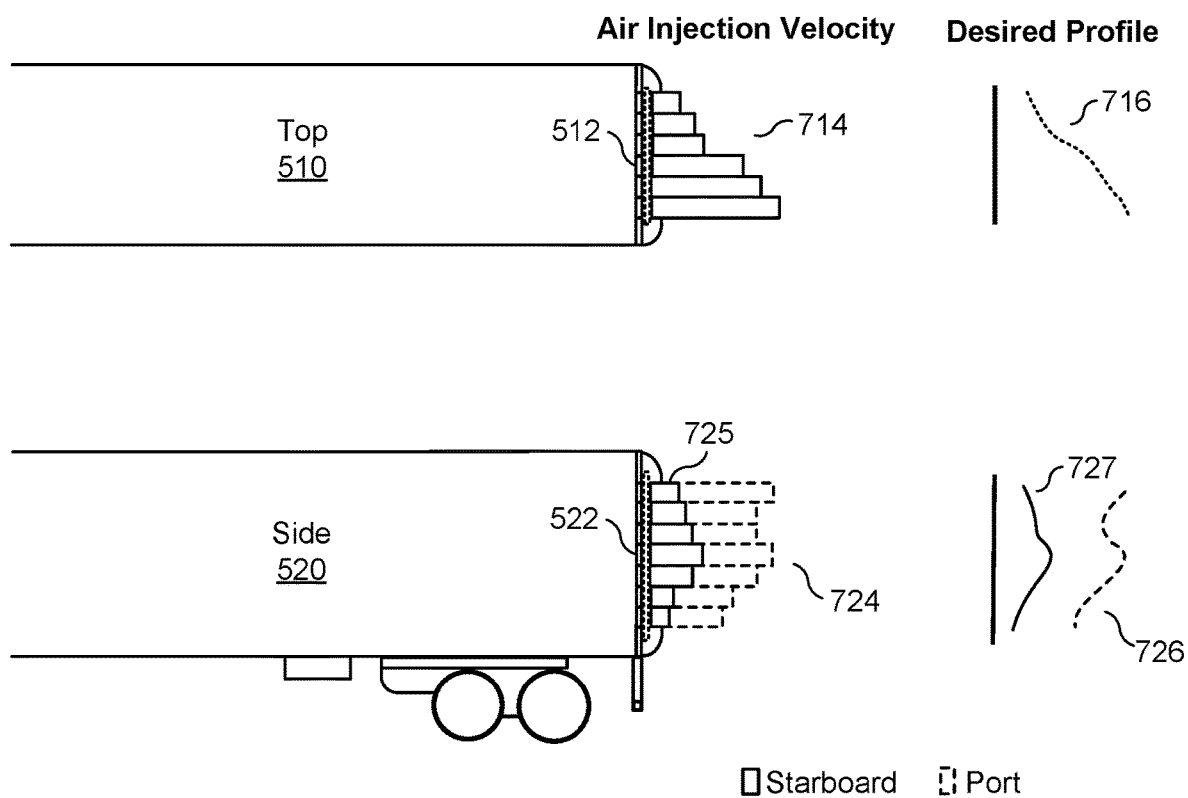
FIG. 7 illustrates an example air velocity profile that may be generated by the modular aerodynamic system to compensate for lateral forces (e.g., generated by a crosswind), according to one embodiment.

FIG. 7 illustrates an example air velocity profile suitable for countering a crosswind (or other lateral force), according to one embodiment. In the example shown, the same modular aerodynamic system 130 as the previous examples is being used. As with the previous examples, the bottom set of nozzles is paired with the top pair of nozzles 512. However, unlike the previous examples, the port set of nozzles 522 is not paired with the starboard set of nozzles. The air injection profile 714 for the top set of nozzles 512 (and the bottom set of nozzles) approximates a desired profile 716 that has a high value (e.g., between twenty-five and fifty-five meters per second) at the port side of the trailer and decreases to a low value (e.g., between five and fifteen meters per second) on the starboard side. The port set of nozzles 522 create a profile 724 that approximate a desired profile 726 that starts high (e.g., between twenty-five and fifty-five meters per second) at the top of the trailer, decreases slightly (e.g., by five to ten meters per second) before returning to the same (or approximately the same) value at the mid-point of the trailer, and then decreases to a medium value (e.g., between twelve and thirty meters per second) at the bottom of the trailer. In contrast, the starboard set of nozzles create a profile 725 that approximates a desired profile 727 with low values (e.g., between four and twelve meters per second) at the top and bottom of the trailer and a peak of a medium value (e.g., between twelve and thirty meters per second) at the mid-point of the trailer. It should be understood that the illustrated profiles are just one example and that variations may be used to achieve lateral force correction.

Computing System Architecture

Figure 8:
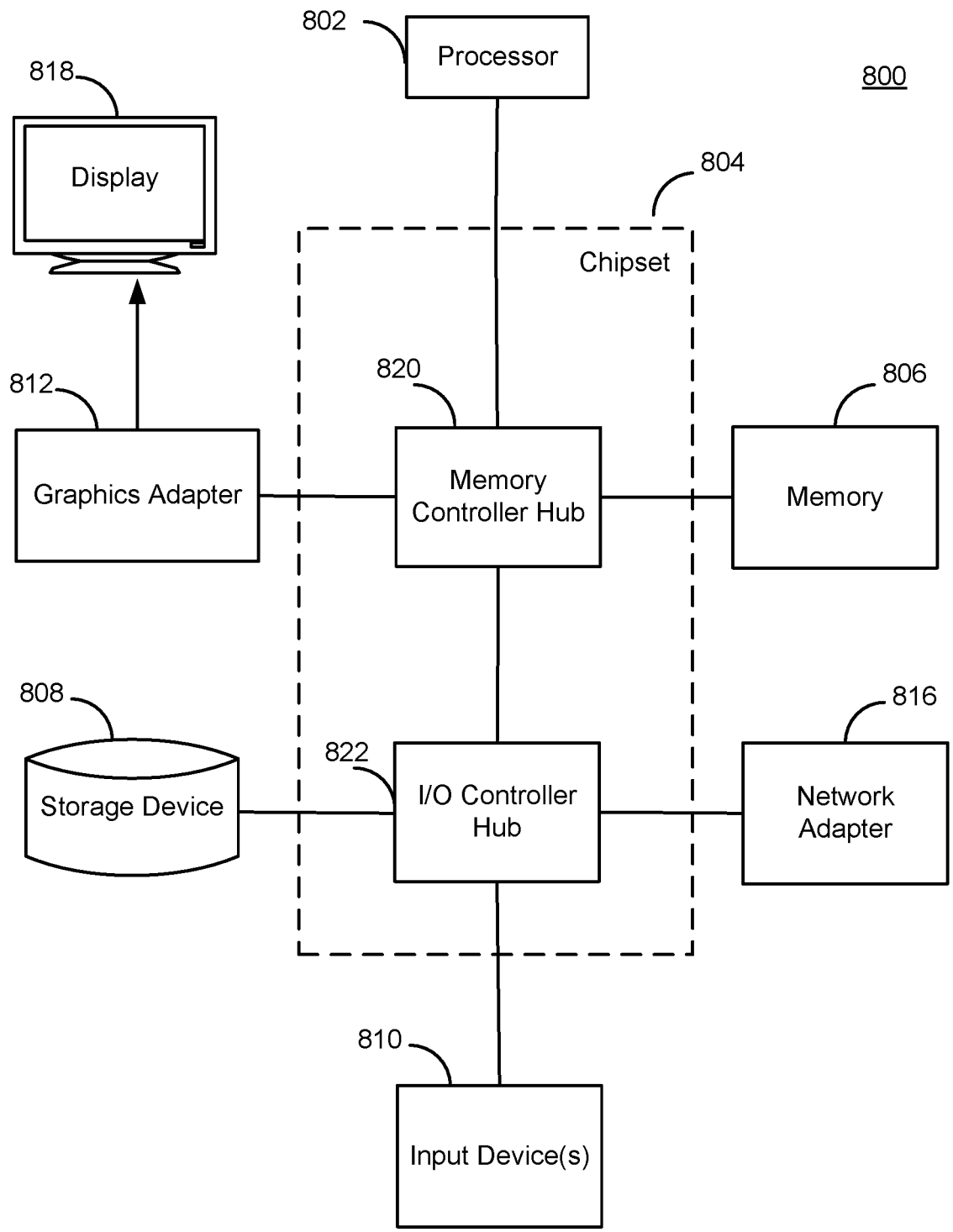
FIG. 8 is a block diagram illustrating an example computer suitable for use as the aerodynamic control system of FIG. 3, according to one embodiment.

FIG. 8 is a block diagram illustrating an example computer 800 suitable for use as an aerodynamic control system 300. The example computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. The display may be part of a dashboard display in a vehicle, integrated with a navigation system, or the like. Alternatively, the display 818 may be one or more indicator lights indicating operational parameters or modes of the modular aerodynamic system 130, or be omitted entirely.

A storage device 808, a network adapter 816, and one or more input devices 810 are coupled to the I/O controller hub 822. The input devices 810 may include a touchscreen display, one or more buttons, one or more switches, or any other controls for controlling operation of the modular aerodynamic system 130. Alternatively, the input devices 810 may be omitted and the modular aerodynamic system 130 may operate autonomously (e.g., as configured by a mechanic or engineer, either remotely or directly). Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The graphics adapter 812 displays images and other information on the display 818. The network adapter 816 may couple the computer system 800 to one or more computer networks. For example, in some embodiments, the computer 800 may provide data about operation of the modular aerodynamic system 130 and/or other components of the vehicle to a server via the internet (e.g., to aid with fleet management). In some embodiments, the computer 800 can lack some of the components described above, such as an input device 810, graphics adapter 812, display 818, or network adapter 816.

Additional Considerations

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven." Similarly, approximately or substantially parallel or perpendicular should be understood to mean within ten degrees of the stated orientation, unless another meaning is apparent.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of above description describe the embodiments in terms of algorithmic processes or operations. These algorithmic descriptions and representations are commonly used in the computing arts. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

While particular embodiments and applications have been illustrated and described, it is to be understood that the described subject matter is not limited to the precise construction and components disclosed. The scope of protection should be limited only by the following claims.

What is claimed is:

1. A modular aerodynamic system for a vehicle, the system comprising:
   a source configured to emit gas with pressures that differ from an ambient pressure surrounding the vehicle;
   a plurality of modular nozzles configured to independently generate airsheets using gas emitted from the source, each airsheet having a corresponding velocity profile and an initial direction; and
   a plurality of air shaping components, each air shaping component including a surface positioned such that a corresponding subset of the airsheets travel along the surface, the surface having a portion that has a non-zero angle relative the initial direction of the corresponding subset of the airsheets such that the corresponding subset of airsheets are redirected, wherein an amount by which each airsheet is redirected is related to the corresponding velocity profile.

2. The modular aerodynamic system of claim 1, wherein the gas emitted by the source is air.

3. The modular aerodynamic system of claim 1, wherein the source is located under the vehicle and configured to collect the gas from the vehicle's environment.

4. The modular aerodynamic system of claim 1, wherein the airsheets have higher momentum closer to the corresponding surfaces than further away from the corresponding surfaces.

5. The modular aerodynamic system of claim 1, wherein at least one of the surfaces is a planar surface at the non-zero angle relative to the initial direction of the corresponding subset of airsheets.

6. The modular aerodynamic system of claim 1, wherein at least one of the surfaces is a curved surface that is substantially parallel to the initial direction of the corresponding subset of airsheets at a point closest to the modular nozzles and curves inwards towards a longitudinal axis of the vehicle as the curved surface extends away from the modular nozzles.

7. The modular aerodynamic system of claim 1, wherein the vehicle is a semi-truck and the plurality of nozzles and the plurality of air shaping components are mounted on a rear end of a trailer of the semi-truck.

8. The modular aerodynamic system of claim 1, wherein the vehicle is a semi-truck and the plurality of nozzles and the plurality of air shaping components are mounted on a rear end of a tractor of the semi-truck.

9. The modular aerodynamic system of claim 1, wherein the source, the plurality of modular nozzles, and the plurality of air shaping components were added to the vehicle as a retrofit.

10. The modular aerodynamic system of claim 1, further comprising a computer-based aerodynamic control system configured to determine a desired air velocity profile and an average velocity for each airsheet that will approximate the desired air velocity profile.

11. The modular aerodynamic system of claim 10, wherein the desired air velocity profile is configured to reduce a length of a turbulent wake of the vehicle, the reduction in length of the turbulent wake reducing drag on the vehicle.

12. The modular aerodynamic system of claim 10, wherein the desired air velocity profile is configured to reduce drag, the desired air velocity profile including higher average velocity air at a port or starboard side of the vehicle than at a top or bottom of the vehicle.

13. The modular aerodynamic system of claim 10, wherein the desired air velocity profile is configured to provide aerodynamic braking of the vehicle, the desired air velocity profile including higher average velocity air at a top or bottom side of the vehicle than at a port or starboard side of the vehicle.

14. The modular aerodynamic system of claim 10, wherein the desired air velocity profile is configured to correct for one or more lateral forces acting on the vehicle, the desired air velocity profile including higher average velocity air at a port or starboard side of the vehicle relative to the opposite side of the vehicle.

15. The modular aerodynamic system of claim 10, further comprising one or more sensor inputs, wherein the desired air velocity profile is determined based on data received by the one or more sensor inputs.

16. The modular aerodynamic system of claim 15, wherein the one or more sensor inputs include a sensor input that receives sensor data via the internet.

17. The modular aerodynamic system of claim 15, wherein the one or more sensor inputs include a sensor input that receives measurements of crosswind strength, and the desired air velocity profile counteracts a lateral force due to the crosswind responsive to the crosswind strength exceeding a compensation threshold.

18. The modular aerodynamic system of claim 17, wherein the computer-based aerodynamic control system is further configured to cause a warning to be displayed responsive to the crosswind strength exceeding a warning threshold.

19. The modular aerodynamic system of claim 18, wherein causing the warning to be displayed comprises sending a notification to a fleet management system via the internet, the fleet management system displaying the warning.

* * * * *